(12) United States Patent
Soga (10) Patent No.: US 8,012,051 B2
(45) Date of Patent: Sep. 6, 2011

(54) OIL PRESSURE CONTROL APPARATUS

(75) Inventor: Yoshinobu Soga, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 473 days.

(21) Appl. No.: 12/206,354

(22) Filed: Sep. 8, 2008

(65) Prior Publication Data

US 2009/0069146 A1   Mar. 12, 2009

(30) Foreign Application Priority Data

Sep. 10, 2007  (JP) .................................. 2007-234592

(51) Int. Cl.
*F16H 59/00* (2006.01)
(52) U.S. Cl. .............................. 474/18; 474/28; 474/110
(58) Field of Classification Search .................... 474/18, 474/28, 110
See application file for complete search history.

(56) References Cited

U.S. PATENT DOCUMENTS

| | | | | |
|---|---|---|---|---|
| 6,443,871 | B2 * | 9/2002 | Taniguchi et al. ............... | 477/44 |
| 7,575,111 | B2 * | 8/2009 | Ogata et al. ..................... | 192/3.3 |
| 2007/0232424 | A1 * | 10/2007 | Nishida ........................... | 474/28 |

FOREIGN PATENT DOCUMENTS

| | | |
|---|---|---|
| JP | 03-213773 A | 9/1991 |
| JP | 05-203045 A | 8/1993 |
| JP | 08-004864 A | 1/1996 |
| JP | 11-182666 A | 7/1999 |
| JP | 2003-120797 A | 4/2003 |
| JP | 2004-169895 A | 6/2004 |
| JP | 2006-153104 A | 6/2006 |
| JP | 2009068522 | 4/2009 |

* cited by examiner

*Primary Examiner* — Sang Kim
(74) *Attorney, Agent, or Firm* — Sughrue Mion, PLLC (57) ABSTRACT

An oil pressure control apparatus includes a belt-driven continuously variable transmission, a primary regulator valve that regulates a line oil pressure that becomes a source pressure of oil pressure of various parts, and a gear oil pressure control valve that supplies gear oil pressure to a driving-side pulley of the belt-driven continuously variable transmission. A failsafe valve is provided between the gear oil pressure control valve and the driving-side pulley. When the gear oil pressure control valve or a linear solenoid valve that controls the gear oil pressure control valve fails, the failsafe valve is switched so as to supply the line oil pressure to the driving-side pulley, and other than during such the gear oil pressure control valve's failure or the electromagnetic valve's failure, the failsafe valve is switched so as to supply the gear oil pressure to the driving-side pulley.

9 Claims, 4 Drawing Sheets

OIL PRESSURE CONTROL APPARATUS

CROSS-REFERENCE TO RELATED APPLICATION

This application claims priority under 35 U.S.C. §119(a) on Japanese Patent Application No. 2007-234592 filed in Japan on Sep. 10, 2007, the entire contents of which are herein incorporated by reference.

BACKGROUND OF THE INVENTION

The present invention relates to an oil pressure control apparatus of a belt-driven continuously variable transmission.

As a continuously variable transmission provided in a vehicle, a belt-driven continuously variable transmission is known in which a belt is clamped with oil pressure to transmit motive power, and a gear ratio is changed by changing a belt hanging radius.

In an oil pressure control apparatus of this sort of belt-driven continuously variable transmission, many control valves of various types, electromagnetic valves that control those control valves, and the like are provided. For example, valves provided include a line oil pressure control valve that regulates a line oil pressure that becomes the source pressure for the oil pressure of various parts; a gear oil pressure control valve that regulates the line oil pressure that becomes the source pressure, and supplies a gear oil pressure that controls a gear ratio of the belt-driven continuously variable transmission to a driving-side pulley (primary pulley) of the belt-driven continuously variable transmission; a clamping oil pressure control valve that likewise regulates the line oil pressure that becomes the source pressure, and supplies a clamping oil pressure that controls belt clamping of the belt-driven continuously variable transmission to a driven-side pulley (secondary pulley) of the belt-driven continuously variable transmission; and the like. Also provided are linear electromagnetic valves, ON-OFF electromagnetic valves, or the like for controlling each of these control valves.

An oil pressure control apparatus of a belt-driven continuously variable transmission is disclosed in JP H3-213773A (referred to below as Patent Document 1) and JP 2006-153104A (referred to below as Patent Document 2). In Patent Document 2, there is a description of control in a case where an electromagnetic valve that controls a gear oil pressure control valve or an electromagnetic valve that controls a clamping oil pressure control valve has failed.

Incidentally, in the oil pressure control apparatus, in each valve or the electromagnetic valve that controls that valve, there may be a mechanical failure of such as a stuck valve, or there may be a failure due to an electrical cause, such as a wire disconnection or a short circuit in an electromagnetic valve. In a conventional oil pressure control apparatus of a belt-driven continuously variable transmission, due to having a configuration in which a gear oil pressure is supplied to a driving-side pulley only from a gear oil pressure control valve, when the gear oil pressure control valve or the electromagnetic valve that controls that valve fails, the gear oil pressure that controls the gear ratio suddenly drops, and as a result, there is a possibility of falling into a state of sudden deceleration. Also, with sudden deceleration there is a possibility that belt slippage or an excessive shock will occur.

In order to avoid this sort of sudden deceleration when a failure occurs, the oil pressure control apparatus can be provided with a control valve having a backup function, for example. However, in this case, a separate electromagnetic valve or the like is necessary in order to control the control valve having the backup function, so there is also the problem of increased cost and size of the apparatus.

In above Patent Document 1, there is no disclosure with respect to compatibility with occurrence of such a failure. In Patent Document 2, there is a description of a case where an electromagnetic valve that controls a gear oil pressure control valve has failed, but there is no disclosure with respect to compatibility with a case where the gear oil pressure control valve itself has failed.

The present invention was made in view of such problems, and it is an object thereof to provide an oil pressure control apparatus in which, without adding a new electromagnetic valve, it is possible to avoid the occurrence of a state of sudden deceleration even when, for example, a gear oil pressure control valve has failed.

SUMMARY OF THE INVENTION

According to the invention, a means for addressing the above problems is configured as follows. That is, the invention provides an oil pressure control apparatus that includes a belt-driven continuously variable transmission in which a belt is clamped with oil pressure to transmit motive power, and a gear ratio is changed by changing a belt hanging radius; a line oil pressure control valve that regulates a line oil pressure that becomes a source pressure of oil pressure of various parts; and a gear oil pressure control valve that supplies a gear oil pressure that controls the gear ratio of the belt-driven continuously variable transmission to a driving-side pulley of the belt-driven continuously variable transmission. A switching means is provided between the gear oil pressure control valve and the driving-side pulley, and is capable of switching the oil pressure supplied to the driving-side pulley between the gear oil pressure and the line oil pressure. When the gear oil pressure control valve or an electromagnetic valve that controls the gear oil pressure control valve fails, the switching means is switched so as to supply the line oil pressure to the driving-side pulley, and other than during such the gear oil pressure control valve's failure or the electromagnetic valve's failure, the switching means is switched so as to supply the gear oil pressure to the driving-side pulley.

According to the above configuration, when the gear oil pressure control valve or an electromagnetic valve that controls the gear oil pressure control valve fails, the line oil pressure is supplied to the driving-side pulley due to switching of the switching means, so it is possible to suppress a sudden drop in the oil pressure that controls the gear ratio of the belt-driven continuously variable transmission, and thus it is possible to avoid the occurrence of a state of sudden deceleration. That is, due to introducing the line oil pressure, the gear ratio changes to an acceleration side, so it is possible to suppress a subsequent change of the gear ratio to the deceleration side. Thus, without adding a new electromagnetic valve, it is possible to avoid the occurrence of a state of sudden deceleration, and it is possible to prevent belt slippage or an excessive shock that occurs along with sudden deceleration. Moreover, it is possible to avoid increased cost and size of the apparatus.

In an example of a specific configuration of the switching means, the switching means is a failsafe valve capable of switching between a normal position that supplies the gear oil pressure to the driving-side pulley, and a fail position that supplies the line oil pressure to the driving-side pulley.

It is preferable that switching of the failsafe valve is controlled with a combination of control oil pressures of at least two existing electromagnetic valves. In this way, by adopting a configuration in which the failsafe valve is switched, by using an existing configuration as-is, it is possible to avoid increased cost and size of the apparatus.

The following configuration is an example of a specific mode of that combination. That is, when a configuration is adopted in which the oil pressure control apparatus includes a hydraulic lockup clutch provided in a hydrodynamic power transmission apparatus provided between a motive power source and the belt-driven continuously variable transmission, the lockup clutch directly coupling the motive power source side and the belt-driven continuously variable transmission side; a hydraulic friction engaging element for travel (for example, a forward movement clutch) that is engaged in order to establish a power transmission path when a vehicle travels; a lockup control valve that is switched when controlling engagement/release of the lockup clutch; and a garage control valve that is capable of switching an engaging oil pressure that is supplied when engaging the friction engaging element for travel between an engagement transition oil pressure and an engagement holding oil pressure; switching of the failsafe valve is performed with a combination of a control oil pressure of a first electromagnetic valve that controls the lockup control valve, and a control oil pressure of a second electromagnetic valve that controls the garage control valve.

Also, it is possible to adopt a configuration in which the failsafe valve is switched to the fail position when the first electromagnetic valve outputs a control oil pressure that switches the lockup control valve when the lockup clutch is engaged, and when the second electromagnetic valve outputs a control oil pressure that switches the garage control valve such that the engagement transition oil pressure is supplied to the friction engaging element for travel, and otherwise the failsafe valve is switched to the normal position.

In this case, it is possible to use ON-OFF electromagnetic valves as both the first electromagnetic valve and the second electromagnetic valve. Also, it is possible to adopt a configuration in which when the first electromagnetic valve and the second electromagnetic valve are both in an ON state in which a control oil pressure is output, the failsafe valve is switched to the fail position.

Here, a configuration may be adopted in which when the gear oil pressure control valve or an electromagnetic valve that controls the gear oil pressure control valve fails, instead of the line oil pressure, a clamping oil pressure that controls a belt clamping pressure of the belt-driven continuously variable transmission is supplied to the driving-side pulley. By adopting such a configuration, when, for example, the gear oil pressure control valve fails, the clamping oil pressure is supplied to the driving-side pulley due to switching of the switching means, so it is possible to suppress a sudden drop in the oil pressure that controls the gear ratio of the belt-driven continuously variable transmission. Thus, without adding a new electromagnetic valve, it is possible to avoid the occurrence of a state of sudden deceleration, and it is possible to prevent belt slippage or an excessive shock that occurs along with sudden deceleration.

Also, it is preferable that while the failsafe valve is being held in the fail position, when vehicle stoppage has been predicted, the failsafe valve is switched from the fail position to the normal position. That is, it is preferable that when vehicle stoppage has been predicted, the control (switching control of the failsafe valve) that avoids occurrence of a state of sudden deceleration in the belt-driven continuously variable transmission is ended. Here, during vehicle stoppage, ordinarily, the gear ratio of the belt-driven continuously variable transmission is returned to a most decelerated state, thus preparing for the next vehicle starting movement. However, when this control is continued, due to introducing the line oil pressure to the driving-side pulley, the gear ratio changes to the acceleration side, so changing of the gear ratio to the deceleration side is inhibited. Accordingly, it is preferable that when vehicle stoppage has been predicted, by ending this control, changing of the gear ratio to the deceleration side is not inhibited. By adopting such a configuration, it is possible to return the gear ratio to the deceleration side by the time that the vehicle stops, so it is possible to prepare for the next vehicle starting movement. Examples of a case when vehicle stoppage has been predicted include, for example, a case when the vehicle speed has fallen to no more than a predetermined speed, and a case when depression of a brake pedal has been detected from a brake signal or the like.

DESCRIPTION OF THE PREFERRED EMBODIMENTS

Hereinafter, preferred embodiments of the present invention will be described in detail with reference to the accompanying drawings.

Figure 1:
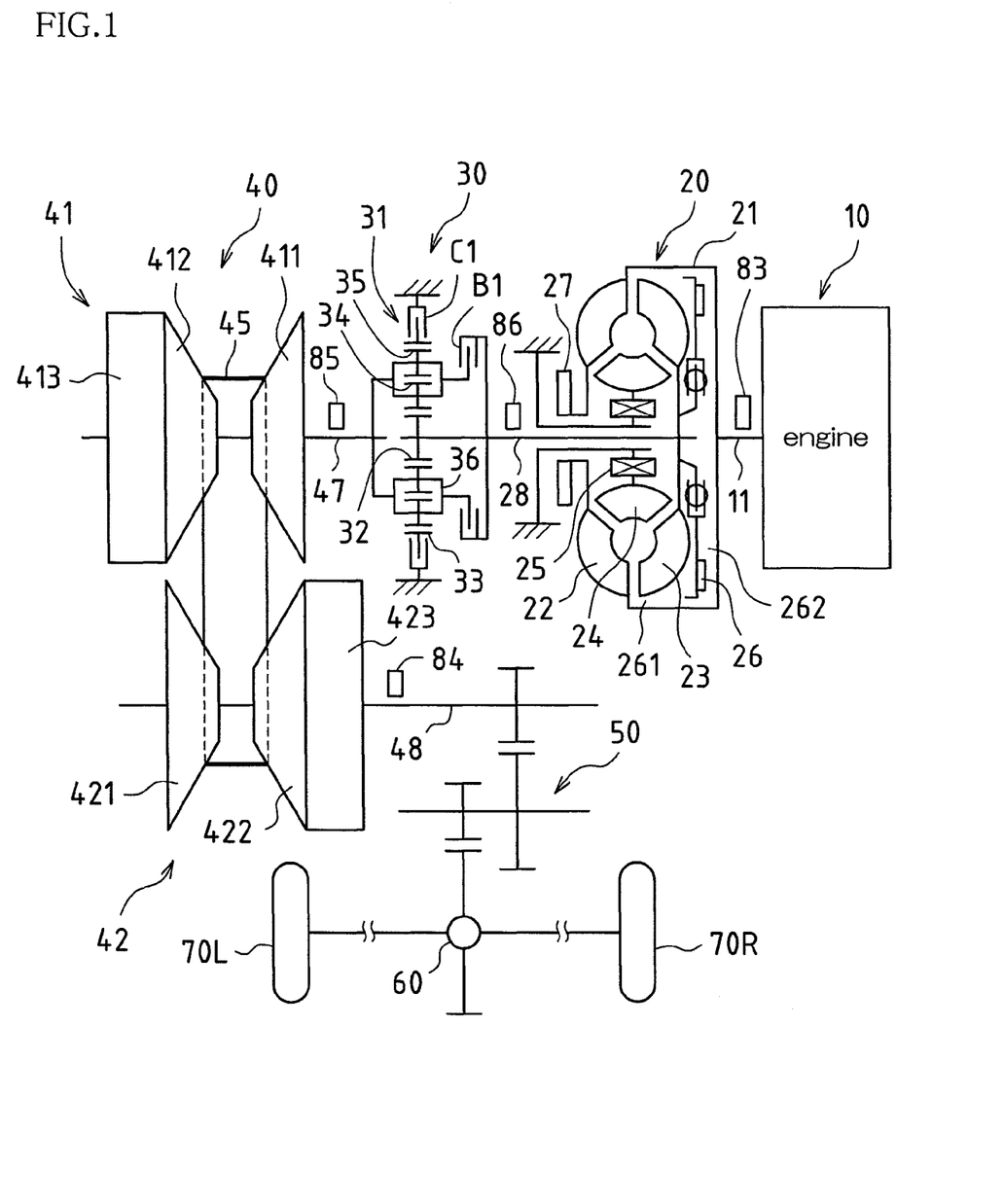
FIG. 1 shows the schematic configuration of a vehicle drive apparatus according to an embodiment.

FIG. 1 shows the schematic configuration of a vehicle drive apparatus according to an embodiment.

The example vehicle drive apparatus shown in FIG. 1 is preferably adopted in an FF (front engine/front drive)-type vehicle. This vehicle drive apparatus is provided with an engine (internal combustion engine) 10 that is a motive power source for travel, a torque converter 20, a forward/rearward switching apparatus 30, a belt-driven continuously variable transmission (CVT) 40, a deceleration gear apparatus 50, and a differential gear apparatus 60. In this vehicle drive apparatus, output of the engine 10 is transmitted from the torque converter 20 to the differential gear apparatus 60 via the forward/rearward switching apparatus 30, the belt-driven continuously variable transmission 40, and the deceleration gear apparatus 50, and distributed to left and right drive wheels 70L and 70R. A power transmission mechanism is configured with, for example, the torque converter 20, the forward/rearward switching apparatus 30, and the belt-driven continuously variable transmission 40.

The torque converter 20 is a hydrodynamic transmission apparatus that transmits motive power via a fluid, and is provided with a pump impeller 22 that is provided integrated with a front cover 21 to which an output shaft 11 of the engine 10 is linked; and a turbine runner 23 that faces the pump impeller 22, is provided adjacent to the inner face of the front cover 21, and is linked to the forward/rearward switching apparatus 30 via a turbine shaft 28. Specifically, the pump impeller 22 and the turbine runner 23 are provided with many blades (not shown), a spiral flow of the fluid is caused by rotation of the pump impeller 22, and by feeding that spiral flow to the turbine runner 23, torque is applied to cause the turbine runner 23 to rotate.

In a portion of the inner circumferential side of the pump impeller 22 and the turbine runner 23, a stator 24 is disposed that changes the flow direction of fluid that has been fed out from the turbine runner 23 so that the fluid flows into the pump impeller 22. The stator 24 is linked to a predetermined fixed portion via a unidirectional clutch 25. Also, the pump impeller 22 is provided with a mechanical oil pump (oil pressure source) 27 that, due to being rotationally driven by the engine 10, generates oil pressure in order to supply working oil to various parts of an oil pressure control circuit 100 (see FIG. 3).

The torque converter 20 is provided with a lockup clutch 26. The lockup clutch 26 is disposed in parallel with an actual torque converter configured from the pump impeller 22, the turbine runner 23, and the stator 24, and the lockup clutch 26 is held by the turbine runner 23 in a state facing the inner face of the front cover 21. The lockup clutch 26 is pressed against the inner face of the front cover 21 by oil pressure, and thus directly transmits torque from the front cover 21, which is an input member, to the turbine runner 23, which is an output member. Here, by controlling that oil pressure, it is possible to control the clutch amount of the lockup clutch 26. Specifically, the lockup clutch 26, by controlling a differential pressure (lockup differential pressure) ΔP of a lockup engaging oil pressure PON supplied to an engaging-side oil pressure chamber 261 and a lockup releasing oil pressure POFF supplied to a releasing-side oil pressure chamber 262 with a lockup control valve 140 of the oil pressure control circuit 100 (see FIG. 3), is completely engaged, half-engaged (engagement in a slipping state), or released.

By completely engaging the lockup clutch 26, the front cover 21 (pump impeller 22) and the turbine runner 23 rotate as a single body. Also, by engaging the lockup clutch 26 in a predetermined slipping state (half-engaged state), the turbine runner 23 rotates following the pump impeller 22 with a predetermined amount of slippage during driving. On the other hand, the lockup clutch 26 is released by setting the lockup differential pressure ΔP to a negative value. Engagement/release of the lockup clutch 26 by the oil pressure control circuit 100 will be described below.

The forward/rearward switching apparatus 30 is provided with a double pinion planetary gear apparatus 31, a forward movement clutch C1, and a rearward movement brake B1.

A sun gear 32 of the planetary gear apparatus 31 is linked together with the turbine shaft 28 of the torque converter 20, and a carrier 36 is linked together with an input shaft 47 of the belt-driven continuously variable transmission 40. The carrier 36 and the sun gear 32 are selectively linked via the forward movement clutch C1. A ring gear 33 is selectively fixed to a housing via the rearward movement brake B1.

Between the sun gear 32 and the ring gear 33, an inside pinion gear 34 that engages with the sun gear 32, and an outside pinion gear 35 that engages with the inside pinion gear 34 and the ring gear 33, are disposed. The pinion gears 34 and 35 are held by the carrier 36 such that they can rotate and revolve.

The forward movement clutch C1 and the rearward movement brake B1 are both hydraulic friction engaging elements for travel that are engaged/released with an oil pressure actuator. Due to the forward movement clutch C1 being engaged and the rearward movement brake B1 being released, a state is established in which the forward/rearward switching apparatus 30 rotates as one body, and in the forward/rearward switching apparatus 30, a forward motive power transmission path is formed. In this state, driving force in the forward direction is transmitted to the belt-driven continuously variable transmission 40 side. On the other hand, due to the rearward movement brake B1 being engaged and the forward movement clutch C1 being released, a rearward motive power transmission path is formed in the forward/rearward switching apparatus 30. In this state, the input shaft 47 rotates in a reverse direction relative to the turbine shaft 28, and this driving force in the rearward direction is transmitted to the belt-driven continuously variable transmission 40 side. When the forward movement clutch C1 and the rearward movement brake B1 are both released, the forward/rearward switching apparatus 30 is in neutral (a blocked state), in which motive power transmission between the engine 10 and the belt-driven continuously variable transmission 40 is blocked.

In more detail, the forward movement clutch C1 and the rearward movement brake B1 are engaged/released by a manual valve 170 of the oil pressure control circuit 100 (see FIG. 3) being mechanically switched according to operation of a shift lever 87 (see FIG. 2), and are both hydraulic friction engaging elements for travel that are engaged/released with an oil pressure actuator. The shift lever 87, for example, is disposed to the side of a driver seat and is operated to switch by a driver. The shift lever 87 is selectively operated to shift positions such as a parking position "P" for parking, a reverse position "R" for rearward travel, a neutral position "N" that blocks motive power transmission, and a drive position "D" for forward travel. In the parking position "P" and the neutral position "N", the forward movement clutch C1 and the rearward movement brake B1 are both released. In the reverse position "R", the rearward movement brake B1 is engaged, and the forward movement clutch C1 is released. In the drive position "D", the forward movement clutch C1 is engaged, and the rearward movement brake B1 is released. Engagement/release of the friction engaging elements for travel (the forward movement clutch C1 and the rearward movement brake B1) of the forward/reverse switching apparatus 30 by the oil pressure control circuit 100 will be described below.

The belt-driven continuously variable transmission 40 transmits motive power by clamping a transmission belt 45 with oil pressure, and changes the gear ratio by changing the belt hanging radius of the transmission belt 45. The belt-driven continuously variable transmission 40 includes a driving-side pulley (primary pulley) 41 provided on the input shaft 47, a driven-side pulley (secondary pulley) 42 provided on an output shaft 48, and the transmission belt 45, which is made of metal and is wrapped around both of these pulleys 41 and 42. The belt-driven continuously variable transmission 40 is configured such that motive power is transmitted via frictional force between both pulleys 41 and 42 and the transmission belt 45.

The driving-side pulley 41 is a variable pulley whose effective diameter is variable, and is configured from a fixed sieve 411 that has been fixed to the input shaft 47, and a movable sieve 412 disposed on the input shaft 47 in a state in which the movable sieve 412 is slidable in only the axial direction. The driven-side pulley 42 likewise is a variable pulley whose effective diameter is variable, and is configured from a fixed sieve 421 that has been fixed to the output shaft 48, and a movable sieve 422 disposed in the output shaft 48 in a state in which the movable sieve 422 is slidable in only the axial direction. In the movable sieve 412 of the driving-side pulley 41, an oil pressure actuator 413 for changing a V channel width between the fixed sieve 411 and the movable sieve 412 is disposed. Likewise in the movable sieve 422 of the driven-side pulley 42, an oil pressure actuator 423 for changing a V channel width between the fixed sieve 421 and the movable sieve 422 is disposed.

In the belt-driven continuously variable transmission 40, by controlling an oil pressure (gear oil pressure) PIN of the oil pressure actuator 413 of the driving-side pulley 41, the V channel width of both pulleys 41 and 42 changes and thus the belt hanging radius (effective diameter) of the transmission belt 45 is changed, so a gear ratio γ (=input shaft rotation speed NIN/output shaft rotation speed NOUT) changes continuously. Also, an oil pressure (clamping oil pressure) POUT of the oil pressure actuator 423 of the driven-side pulley 42 is controlled such that within a range that slippage of the transmission belt 45 does not occur, a predetermined belt clamping force (frictional force) that transmits transmission torque is generated.

Figure 2:
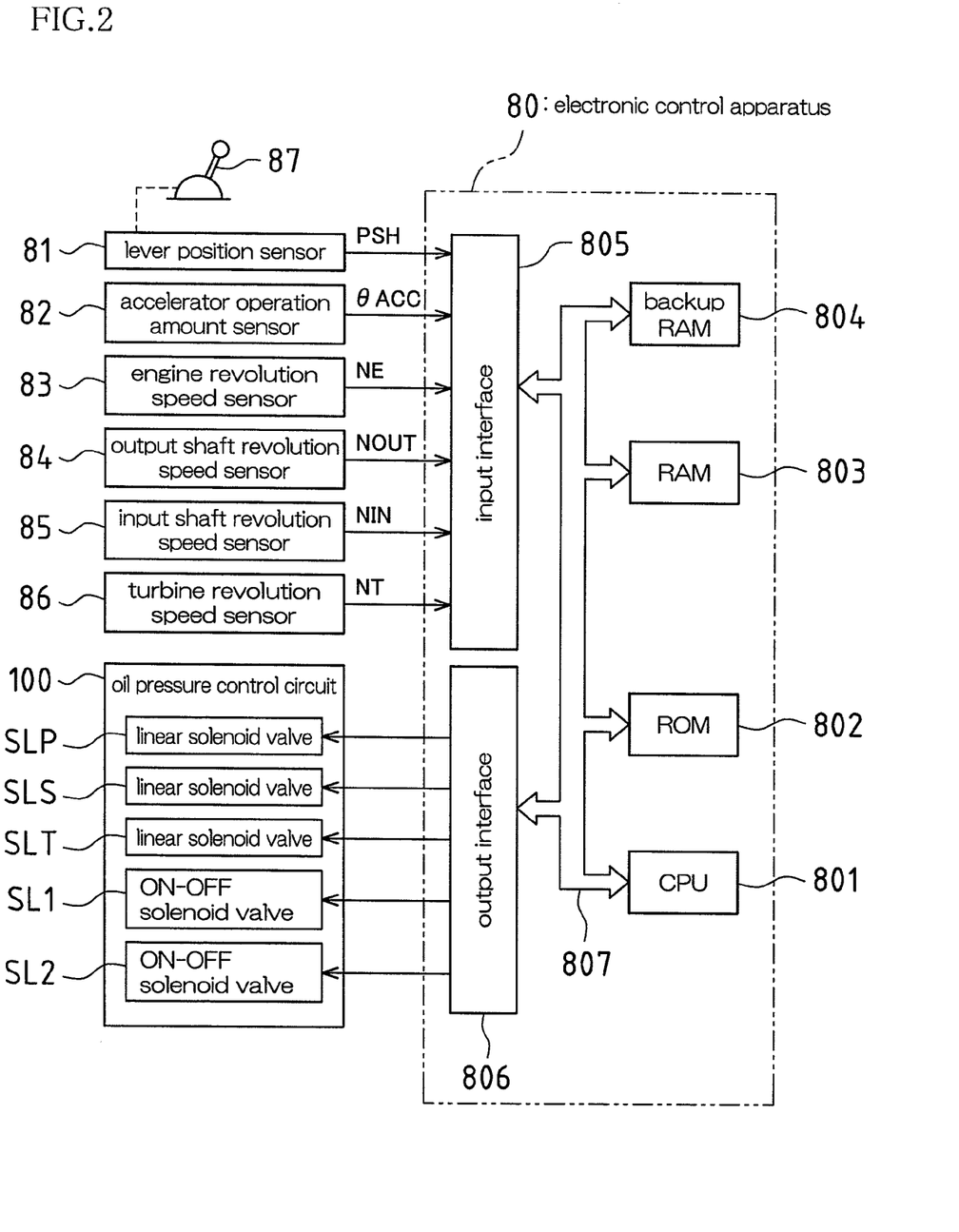
FIG. 2 is a block diagram that shows an example of a control system of a power transmission mechanism of the vehicle drive apparatus in FIG. 1.

The gear oil pressure PIN of the oil pressure actuator 413 of the driving-side pulley 41, and the clamping oil pressure POUT of the oil pressure actuator 423 of the driven-side pulley 42, are each regulated according to commands from an electronic control apparatus 80 (see FIG. 2). Here, the gear oil pressure PIN is controlled to regulate the pressure with a gear oil pressure control valve 120 of the oil pressure control circuit 100 (see FIG. 3). Also, the clamping oil pressure POUT is controlled to regulate the pressure with a clamping oil pressure control valve 130 of the oil pressure control circuit 100. Regulation of the gear oil pressure PIN and the clamping oil pressure POUT of the belt-driven continuously variable transmission 40 by the oil pressure control circuit 100 will be described below.

FIG. 2 is a block diagram that shows an example of a control system of a power transmission mechanism of the vehicle drive apparatus described above.

The electronic control apparatus 80 shown by way of example in FIG. 2 is provided with a CPU 801, a ROM 802, a RAM 803, and a backup RAM 804. The CPU 801 performs signal processing according to a program stored in advance in the ROM 802 while employing a temporary storage function of the RAM 803, and thus various controls are executed, such as control to regulate the gear oil pressure PIN and the clamping oil pressure POUT of the belt-driven continuously variable transmission 40, control of engagement/release of the friction engaging elements for travel (the forward movement clutch C1 and the rearward movement brake B1) of the forward/reverse switching apparatus 30, control of engagement/ release of the lockup clutch 26 of the torque converter 20, and control to regulate a line oil pressure PL that becomes a source pressure of the oil pressure of various parts.

Described in more detail, various control programs, maps referred to when executing the various control programs, and the like are stored in the ROM 802. The CPU 801 executes computational processing based on the various control programs and maps stored in the ROM 802. The RAM 803 is a memory that temporarily stores the results of computational processing with the CPU 801, data input from various sensors, and the like, and the backup RAM 804 is a nonvolatile memory that stores data from the RAM 803 that should be saved when the engine 10 is stopped. Via a bi-directional bus 807, the CPU 801, the ROM 802, the RAM 803, and the backup RAM 804 are connected to each other, and also connected to an input interface 805 and an output interface 806.

Connected to the input interface 805 are various sensors for detecting the operating state (or the state of travel) of the vehicle in which the above vehicle drive apparatus is mounted. Specifically, connected to the input interface 805 are, for example, a lever position sensor 81, an accelerator operation amount sensor 82, an engine revolution speed sensor 83, an output shaft revolution speed sensor 84 that also functions as a vehicle speed sensor, an input shaft revolution speed sensor 85, and a turbine revolution speed sensor 86. The lever position sensor 81, for example, is provided with a plurality of ON-OFF switches that detect that the shift lever 87 has been operated to a shift position such as the parking position "P", the reverse position "R", the neutral position "N", and the drive position "D".

Signals that indicate, for example, a lever position (operating position) PSH of the shift lever 87, an operation amount θ ACC of an accelerator operation member such as an accelerator pedal (accelerator operation amount), a revolution speed NE of the engine 10 (engine revolution speed), a revolution speed NOUT of the output shaft 48 of the belt-driven continuously variable transmission 40 (output shaft revolution speed), a revolution speed NIN of the input shaft 47 of the belt-driven continuously variable transmission 40 (input shaft revolution speed), and a revolution speed NT of the turbine shaft 28 of the torque converter 20 (turbine revolution speed) are supplied to the electronic control apparatus 80 from each of these various sensors. The turbine revolution speed NT matches the input shaft revolution speed NIN during forward travel, in which state the forward movement clutch C1 of the forward/reverse switching apparatus 30 has been engaged. The output shaft revolution speed NOUT corresponds to a vehicle speed V. The accelerator opening degree θ ACC expresses the driver's requested amount of output.

Figure 3:
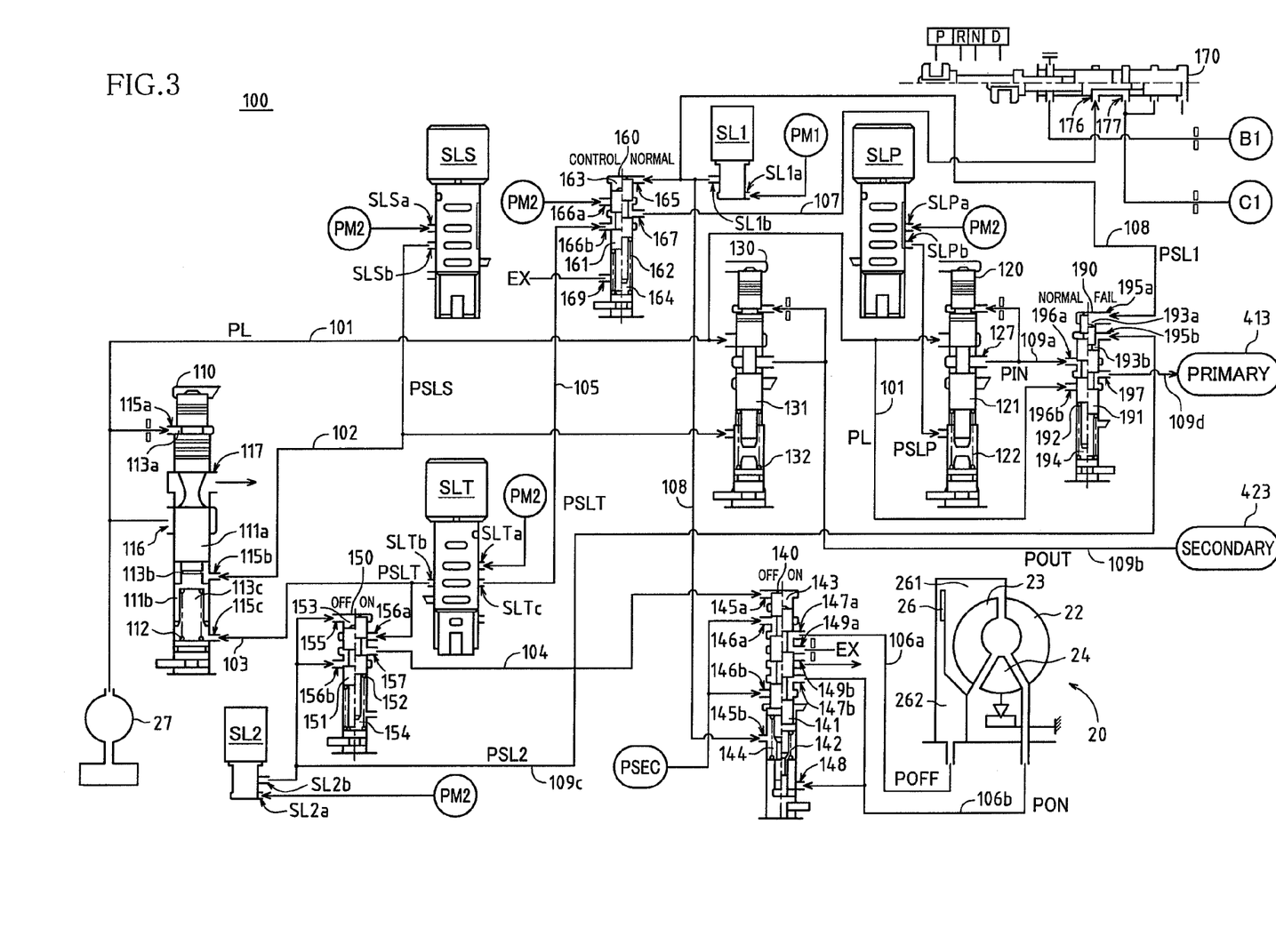
FIG. 3 is a circuit diagram that shows an example of an oil pressure control circuit for controlling the power transmission mechanism of the vehicle drive apparatus in FIG. 1.

Linear solenoid valves SLP, SLS, and SLT, an ON-OFF solenoid valve SL1, and the like of the oil pressure control circuit 100 are connected to the output interface 806. The electronic control apparatus 80 controls exciting current of the linear solenoid valves SLP, SLS, and SLT of the oil pressure control circuit 100, and along with respectively regulating control oil pressures PSLP, PSLS, and PSLT that are output from these linear solenoids SLP, SLS, and SLT, switches the ON-OFF solenoid valves SL1 and SL2 of the oil pressure control circuit 100 between an ON state (excited state) and an OFF state (non-excited state). Thus, control to regulate the gear oil pressure PIN and the clamping oil pressure POUT of the belt-driven continuously variable transmission 40, control of engagement/release of the friction engaging elements for travel of the forward/reverse switching apparatus 30, control of engagement/release of the lockup clutch 26, and control to regulate the line oil pressure PL, and the like are performed.

FIG. 3 is a circuit diagram that shows an example of an oil pressure control circuit for controlling the power transmission mechanism of the above vehicle drive apparatus.

The oil pressure control circuit 100 shown by way of example in FIG. 3 includes the oil pump 27, the gear oil pressure control valve 120 (referred to as a gear oil pressure control valve in the present invention), the clamping oil pressure control valve 130, the lockup control valve 140, and the manual valve 170 described above, and further includes a primary regulator valve 110 (referred to as a line oil pressure control valve in the present invention), a switching valve 150, a garage shift valve 160 (referred to as a garage control valve in the present invention), and a failsafe valve 190 (referred to as a switching means in the present invention). The oil pressure control circuit 100 includes the above-described linear solenoid valves SLP, SLS, and SLT, and ON-OFF solenoid valves SL1 and SL2, connected to the electronic control apparatus 80. Note that with respect to the oil pressure control circuit 100 shown in FIG. 3, a part of the oil pressure control circuit of the power transmission mechanism of the vehicle drive apparatus is schematically shown, but other than the configuration shown in FIG. 3, the actual oil pressure control also includes unshown valves, oil paths, and the like.

In the oil pressure control circuit 100, oil pressure generated by the oil pump 27 is regulated to the line oil pressure PL that becomes the source pressure of the oil pressure of various parts by the primary regulator valve 110. The line oil pressure PL regulated by the primary regulator valve 110 is supplied via an oil path 101 to various parts of the oil pressure control circuit 100, such as the gear oil pressure control valve 120 and the clamping oil pressure control valve 130.

The primary regulator valve 110 is provided with a first spool 111*a* and a second spool 111*b* that are movable in the axial direction, and a spring 112 that serves as a biasing means that biases the first spool 111*a* and the second spool 111*b* in one direction. In FIG. 3, the first spool 111*a* provided on the upper side and the second spool 111*b* provided on the lower side are both slidable in the vertical direction. The primary regulator valve 110 is provided with control ports 115*a*, 115*b*, and 115*c*, an input port 116, and an output port 117.

With the first spool 111*a*, the input port 116 and the output port 117 are put in communication or blocked from each other. The spring 112 is disposed in a compressed state in a control oil pressure chamber 113*c* provided on one end side (the lower end side in FIG. 3) of the second spool 111*b*. That is, the control oil pressure chamber 113*c* is a spring chamber where the spring 112 is disposed. With biasing force of the spring 112, the second spool 111*b* and the first spool 111*a* are pressed against in the direction (the upper direction in FIG. 3) that the input port 116 and the output port 117 are blocked.

The control port 115*a* is connected to a control oil pressure chamber 113*a* provided on the other end side (the upper end side in FIG. 3) of the first spool 111*a*. Also, the control port 115*a* is connected to the oil path 101. Via this control port 116*a*, the line oil pressure PL is supplied to a control oil pressure chamber 113*a*.

The control port 115*b* is connected to a control oil pressure chamber 113*b* provided between one end side of the first spool 111*a* and the other end side of the second spool 111*b*. Also, the control port 115*b* is connected to an output port SLSb of the linear solenoid valve SLS via an oil path 102. Via this control port 115*b*, the output oil pressure (control oil pressure) PSLS of the linear solenoid valve SLS is supplied to the control oil pressure chamber 113*b*.

The control port 115*c* is connected to the above-described control oil pressure chamber 113*c*. The control port 115*c* is connected to an output port SLTb of the linear solenoid valve SLT via an oil path 103. Via this control port 115*c*, the output oil pressure (control oil pressure) PSLT of the linear solenoid valve SLT is supplied to the control oil pressure chamber 113*c*.

The input port 116 is connected to the oil path 101. The line oil pressure PL is input via the input port 116. The output port 117 is connected to an unshown secondary regulator valve.

The first spool 111*a* slides vertically according to the balance of the combined force of the line oil pressure PL that is introduced to the control oil pressure chamber 113*a*, the control oil pressure PSLS that is introduced to the control oil pressure chamber 113*b*, or the control oil pressure PSLT that is introduced to the control oil pressure chamber 113*c*, and the biasing force of the spring 112. While the combined force is greater than the force from the line oil pressure PL, the input port 116 and the output port 117 are blocked from each other. On the other hand, when the line oil pressure PL is greater than the combined force, the first spool 111*a* moves downward in FIG. 3, so the input port 116 and the output port 117 are put in communication with each other. Thus, by oil pressure from the oil path 101 being drained via the output port 117, the line oil pressure PL is adjusted. Accordingly, by controlling the oil pressure of at least one of the control oil pressure PSLS of the linear solenoid valve SLS and the control oil pressure PSLT of the linear solenoid valve SLT, it is possible to control regulation of the line oil pressure PL.

Here, the first spool 111*a* and the second spool 111*b* are formed with the same diameter. Therefore, the acting area (pressure receiving area) of the control oil pressure PSLS supplied via the control port 115*b* on the first spool 111*a*, the acting area (pressure receiving area) of the control oil pressure PSLS on the second spool 111*b*, and the acting area (pressure receiving area) of the control oil pressure PSLT supplied via the control port 115*c* on the second spool 111*b* are the same.

Thus, the higher oil pressure among the control oil pressure PSLS introduced to the control oil pressure chamber 113*b* and the control oil pressure PSLT introduced to the control oil pressure chamber 113*c* contributes to the combined force described above. That is, the primary regulator valve 110 is configured to control regulation of the line oil pressure PL by selecting the higher oil pressure among the control oil pressure PSLS and the control oil pressure PSLT. Specifically, the primary regulator valve 110 is configured such that when the control oil pressure PSLS is higher than the control oil pressure PSLT, the first spool 111*a* moves vertically in a state separated from the second spook 111*b*, and when the control oil pressure PSLT is higher than the control oil pressure PSLS, both spools 111*a* and 111*b* move vertically together in contact with each other. In this way, when controlling the line oil pressure PL, without computing, for example, the two control oil pressures PSLS and PSLT, the higher oil pressure among the two control oil pressures PSLS and PSLT is selected automatically, so it is possible to easily control the line oil pressure PL.

The gear oil pressure control valve 120 is provided with a spool 121 that is movable in the axial direction and a spring 122 that serves as a biasing means that biases the spool 121 in one direction. The gear oil pressure control valve 120 is configured to continuously control regulation of the line oil pressure PL that becomes the source pressure, using the output oil pressure (control oil pressure) PSLP of the linear solenoid valve SLP as a pilot pressure. The oil pressure (gear oil pressure PIN) adjusted by the gear oil pressure control valve 120 is supplied to the oil pressure actuator 413 of the driving-side pulley 41 via oil paths 109*a* and 109*d*. The failsafe valve 190 described below is provided between the gear oil pressure control valve 120 and the oil pressure actuator 413 (between the oil paths 109*a* and 109*d*). Here, the failsafe valve 190 is switched to the normal position shown in the left half in FIG. 3, so the oil paths 109*a* and 109*d* are in communication.

Accordingly, control of regulation of the gear oil pressure PIN is performed by controlling the control oil pressure PSLP of the linear solenoid valve SLP. Because the above control oil pressure PSLP changes linearly according to the exciting current, a gear ratio $\gamma$ of the belt-driven continuously variable transmission 40 changes continuously according to this control oil pressure PSLP. In this case, for example, such that a target input shaft revolution speed is set based on the vehicle state indicated by the actual vehicle speed V and the accelerator opening degree $\theta$ ACC from a gear map that has been stored in advance in the ROM 802 matches the actual input shaft revolution speed NIN, the gear ratio $\gamma$ of the belt-driven continuously variable transmission 40 is changed according to the difference (deviation) between those revolution speeds. The gear map indicates gear conditions, and for example, provides the relationship between the vehicle speed V and the target input shaft revolution speed, which is the target input revolution speed of the belt-driven continuously variable transmission 40, using the accelerator opening degree $\theta$ ACC as a parameter.

The clamping oil pressure control valve 130 is provided with a spool 131 that is movable in the axial direction and a spring 132 that serves as a biasing means that biases the spool 131 in one direction. The clamping oil pressure control valve 130 is configured to continuously control regulation of the line oil pressure PL that becomes the source pressure, using the control oil pressure PSLS of the linear solenoid valve SLS as a pilot pressure. The oil pressure (clamping oil pressure POUT) adjusted by the clamping oil pressure control valve 130 is supplied to the oil pressure actuator 423 of the driven-side pulley 42 via an oil path 109b.

Accordingly, control of regulation of the clamping oil pressure POUT is performed by controlling the control oil pressure PSLS of the linear solenoid valve SLS. Because the above control oil pressure PSLS changes linearly according to the exciting current, the belt clamping pressure of the belt-driven continuously variable transmission 40 is changed continuously according to this control oil pressure PSLS. In this case, for example, the clamping oil pressure POUT of the oil pressure actuator 423 of the driven-side pulley 42 is regulated such that a necessary target gear oil pressure, that is set based on the vehicle state indicated by the actual gear ratio $\gamma$ and the accelerator opening degree $\theta$ ACC from a clamping map that has been stored in advance in the ROM 802, is obtained, and the belt clamping pressure of the belt-driven continuously variable transmission 40 is changed according to this clamping pressure POUT. The clamping map provides the relationship between the gear ratio $\gamma$ and the necessary target gear oil pressure, using the accelerator opening degree $\theta$ ACC as a parameter, and this relationship is obtained through testing in advance such that belt slippage does not occur.

Figure 4:
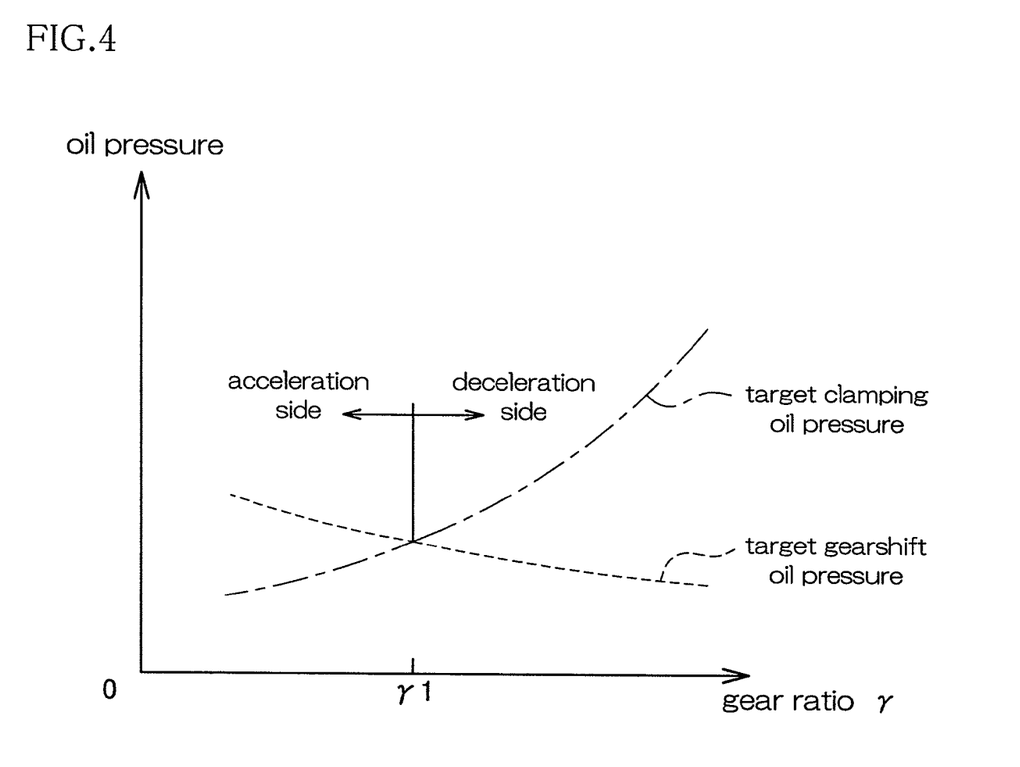
FIG. 4 shows changes in set values of a target gear oil pressure and a target clamping oil pressure according to a gear ratio of a belt-driven continuously variable transmission.

Here, the gear oil pressure PIN and the clamping oil pressure POUT are obtained by regulating the line oil pressure PL that becomes the source pressure, so it is necessary that the line oil pressure PL is at least no less than the gear oil pressure PIN and the clamping oil pressure POUT. Therefore, it is necessary to drive the oil pump 27 such that a line oil pressure PL is obtained that is no less than the target gear oil pressure and the target clamping oil pressure necessary in order to control the gear ratio $\gamma$ and the clamping pressure of the belt-driven continuously variable transmission 40. In this case, the necessary target gear oil pressure and target clamping oil pressure are set as shown in FIG. 4, for example. FIG. 4 shows an example of changes in the set values of the necessary target gear oil pressure and target clamping oil pressure according to the gear ratio $\gamma$ of the belt-driven continuously variable transmission 40, under conditions in which the input shaft revolution speed NIN and the input torque are fixed. In FIG. 4, the broken line indicates changes in the target gear oil pressure, and the single-dotted chained line indicates changes in the target clamping oil pressure.

On an acceleration side (the left side in FIG. 4) where the gear ratio $\gamma$ is lower than $\gamma1$, the target gear oil pressure is set higher than the target clamping oil pressure, and the difference between those oil pressures increases as the degree of acceleration increases. On the other hand, on a deceleration side (the right side in FIG. 4) where the gear ratio $\gamma$ is higher than $\gamma1$, the target clamping oil pressure is set higher than the target gear oil pressure, and the difference between those oil pressures increases as the degree of deceleration increases. That is, the set values of the target gear oil pressure and the target clamping oil pressure are reversed with the change in the gear ratio $\gamma$ (with the above gear ratio $\gamma1$ as the switching point). In order to suppress driving failure of the oil pump 27, when the gear ratio $\gamma$ is higher than $\gamma1$, it is preferable to set the line oil pressure PL to be the same as or slightly higher than the target clamping oil pressure, and when the gear ratio $\gamma$ is lower than $\gamma1$, it is preferable to set the line oil pressure PL to be the same as or slightly higher than the target gear oil pressure. A gear ratio of "1" is given as the specific value of the gear ratio $\gamma1$, but this is not a limitation.

The switching valve 150 switches the oil pressure supplied to the lockup control valve 140 to either one of the control oil pressure PSLT of the linear solenoid valve SLT and an output oil pressure (control oil pressure) PSL2 of the ON-OFF solenoid valve SL2. The switching valve 150 is configured to be capable of switching between the ON position shown in the left half in FIG. 3 and the OFF position shown in the right half in FIG. 3 by controlling the control oil pressure PSL2.

The switching valve 150 is provided between the lockup control valve 140 and the linear solenoid valve SLT. The switching valve 150 is provided with a spool 151 that is movable in the axial direction and a spring 152 that serves as a biasing means that biases the spool 151 in one direction. In FIG. 3, the spool 151 is slidable in the vertical direction. The spring 152 is disposed in a compressed state in a spring chamber 154 provided on one end side of the spool 151 (the lower end side in FIG. 3). With biasing force of the spring 152, the spool 151 is pressed against in the direction (the upper direction in FIG. 3) that the switching valve 150 is held in the above-described OFF position. The switching valve 150 is provided with a control port 155, input ports 156a and 156b, and an output port 157.

The control port 155 is connected to a control oil pressure chamber 153 provided on the other end side (the upper end side in FIG. 3) of the spool 151. Also, the control port 155 is connected to an output port SL2b of the ON-OFF solenoid valve SL2 via an oil path 109c. The control oil pressure PSL2 of the ON-OFF solenoid valve SL2 is supplied to the control oil pressure chamber 153 via the control port 155.

The input port 156a is connected to the output port SLTb of the linear solenoid valve SLT via the oil path 103. The control oil pressure PSLT of the linear solenoid valve SLT is input via the input port 156a. The input port 156b is connected to an output port SL2b of the ON-OFF solenoid valve SL2 via the oil path 109c. The aforementioned control oil pressure PSL2 is input via the input port 156a. The output port 157 is connected to a control port 145a of the lockup control valve 140 via an oil path 104.

Next is a description of switching operation of the switching valve 150.

In this embodiment, the ON-OFF solenoid valve SL2 is provided as a control valve for performing switching of the switching valve 150. The ON-OFF solenoid valve SL2 is configured to switch between the ON state and the OFF state according to commands sent from the electronic control apparatus 80. It is possible to use a normally closed-type electromagnetic valve as described below as the ON-OFF solenoid valve SL2, and a configuration may also be adopted in which a normally open-type electromagnetic valve is used. Also note that instead of the ON-OFF solenoid valve SL2, it is possible to use a linear-type electromagnetic valve, a duty-type electromagnetic valve, a three-way valve-type electromagnetic valve, or the like as the control valve for performing switching of the switching valve 150.

Specifically, when the ON-OFF solenoid valve SL2 is in the ON state, a predetermined control oil pressure PSL2 is output from the output port SL2b, and that control oil pressure PSL2 is supplied to the switching valve 150. With that control oil pressure PSL2, the spool 151 moves downward against the biasing force of the spring 152. Thus, the switching valve 150 is held in the ON position. On the other hand, when the ON-OFF solenoid valve SL2 is in the OFF state, output of that control oil pressure PSL2 is stopped. Then, the spool 151 moves upward due to the biasing force of the spring 152 and returns to its original position. Thus, the switching valve 150 is held in the OFF position. Also, a second modulator oil pressure PM2 regulated by a second modulator valve using the line oil pressure PL as the source pressure is introduced to the ON-OFF solenoid valve SL2 via an input port SL2a.

The ON-OFF solenoid valve SL2 is controlled to the OFF state when performing engagement/release of the lockup clutch 26 (during an engagement/release operation of the lockup clutch 26). In this case, supply of the control oil pressure PSL2 of the ON-OFF solenoid valve SL2 to the control oil pressure chamber 153 is stopped, so the switching valve 150 is held in the OFF position. Thus, the input port 156a and the output port 157 are in communication. Due to the input port 156a and the output port 157 being in communication, the control oil pressure PSLT of the linear solenoid valve SLT is supplied to a control oil pressure chamber 143 of the lockup control valve 140.

On the other hand, the ON-OFF solenoid valve SL2 is controlled to the ON state when not performing engagement/release of the lockup clutch 26 (when the lockup clutch 26 is in a state of complete engagement or complete release). Along with this, control oil pressure PSL2 of the ON-OFF solenoid valve SL2 is introduced to the control oil pressure chamber 153 via the control port 155, and thus the switching valve 150 is held in the ON position. Thus, the input port 156b and the output port 157 are in communication. Due to the input port 156b and the output port 157 being in communication, the control oil pressure PSL2 of the ON-OFF solenoid valve SL2 is supplied to the control oil pressure chamber 143 of the lockup control valve 140.

Accordingly, when the switching valve 150 is being held in the OFF position, the control oil pressure PSLT is introduced to the control oil pressure chamber 143, and engagement/release of the lockup clutch 26 is controlled based on this control oil pressure PSLT. On the other hand, when the switching valve 150 is being held in the ON position, the control oil pressure PSL2 is introduced to the control oil pressure chamber 143 of the lockup control valve 140, and in this case, the lockup clutch 26 is held in a completely engaged state. The control oil pressure PSL2 of the ON-OFF solenoid valve SL2 is set to a pressure that is no less than the maximum value of the above control oil pressure PSLT, and that is a pressure at which it is possible to hold the lockup clutch 26 in the completely engaged state. Control of engagement/release of the lockup clutch 26 will be described below.

The manual valve 170 is a switching valve that switches the supply of oil pressure to the forward movement clutch C1 and the rearward movement brake B1 of the forward/rearward switching apparatus 30 according to operation of the shift lever 87. The manual valve 170 is switched corresponding to the shift positions of the shift lever 87, such as the parking position "P", the reverse position "R", the neutral position "N", and the drive position "D".

When the manual valve 170 is being switched corresponding to the parking position "P" and the neutral position "N" of the shift lever 87, oil pressure is not supplied to an oil pressure servo of the forward movement clutch C1 and an oil pressure servo of the rearward movement brake B1. Working oil of the oil pressure servo of the forward movement clutch C1 and the oil pressure servo of the rearward movement brake B1 is drained via the manual valve 170. Thus, both the forward movement clutch C1 and the rearward movement brake B1 are released.

When the manual valve 170 is being switched corresponding to the reverse position "R" of the shift lever 87, oil pressure is supplied to the oil pressure servo of the rearward movement brake B1, and oil pressure is not supplied to the oil pressure servo of the forward movement clutch C1. Working oil of the oil pressure servo of the forward movement clutch C1 is drained via the manual valve 170. Thus, the rearward movement brake B1 is engaged, and the forward movement clutch C1 is released.

When the manual valve 170 is being switched corresponding to the drive position "D" of the shift lever 87, an input port 176 and an output port 177 are in communication, and so oil pressure is supplied to the oil pressure servo of the forward movement clutch C1. On the other hand, oil pressure is not supplied to the oil pressure servo of the rearward movement brake B1. Working oil of the oil pressure servo of the rearward movement brake B1 is drained via the manual valve 170. Thus, the forward movement clutch C1 is engaged, and the rearward movement brake B1 is released. The supply of oil pressure that accompanies engagement of the forward movement clutch C1 is performed via the garage shift valve 160, described next.

The garage shift valve 160 is a switching valve that, during garage shifting, switches the oil path corresponding to a state of engagement transition or a state of engagement (a state of complete engagement) of the friction engaging elements for travel (the forward movement clutch C1 and the rearward movement brake B1) of the forward/reverse switching apparatus 30. Due to this switching of the garage shift valve 160, for example, when the shift lever 87 has been operated from a non-travel position such as the parking position "P" or the neutral position "N" to a travel position such as the drive position "D" when starting to move the vehicle or the like, the oil pressure supplied to the oil pressure servo of the forward movement clutch C1 is switched between an engagement transition oil pressure that corresponds to the state of engagement transition and an engagement holding oil pressure that corresponds to the state of complete engagement. Likewise, when the shift lever 87 has been operated to the reverse position "R", due to switching of the garage shift valve 160, the oil pressure supplied to the oil pressure servo of the rearward movement brake B1 is switched between the engagement transition oil pressure that corresponds to the state of engagement transition and the engagement holding oil pressure that corresponds to the state of complete engagement. Note that below, as a representative example, a case will be described in which the oil pressure supplied to the oil pressure servo of the forward movement clutch C1 is switched by the garage shift valve 160.

Specifically, the garage shift valve 160 is configured such that when the forward movement clutch C1 is in the state of engagement transition, the garage shift valve 160 is switched to the control position shown in the left half in FIG. 3, and when the forward movement clutch C1 is in the state of complete engagement, the garage shift valve 160 is switched to the normal position shown in the right half in FIG. 3. Switching of the garage shift valve 160 is performed by controlling an output oil pressure (control oil pressure) PSL1 of the ON-OFF solenoid valve SL1.

The garage shift valve 160 is provided with a spool 161 that is movable in the axial direction and a spring 162 that serves as a biasing means that biases the spool 161 in one direction. The spool 161 is provided so as to be slidable vertically in FIG. 3. The spring 162 is disposed in a compressed state in a spring chamber 164 provided on one end side (the bottom end side in FIG. 3) of the spool 161. Due to the biasing force of the spring 162, the spool 161 is pressed against in the direction (upward in FIG. 3) that holds the garage shift valve 160 in the aforementioned normal direction. The garage shift valve 160 is provided with a control port 165, input ports 166*a* and 166*b*, an output port 167, and a drain port 169.

The control port 165*c* is connected to a control oil pressure chamber 163 that is provided on the other end side (the upper end side in FIG. 3) of the spool 161. Also, the control port 165 is connected to an output port SL1*b* of the ON-OFF solenoid valve SL1. The control oil pressure PSL1 of the ON-OFF solenoid valve SL1 is supplied to the control oil pressure chamber 163 via the control port 165.

The input port 166*a* is connected to an unshown second modulator valve. The aforementioned second modulator oil pressure PM2 that has been regulated by the second modulator valve is input via the input port 166*a*. The input port 166*b* is connected to an output port SLTc of the linear solenoid valve SLT via an oil path 105. The control oil pressure PSLT of the linear solenoid valve SLT is input via the input port 166*b*.

The output port 167 is connected to the input port 176 of the manual valve 170 via an oil path 107. The drain port 169 is connected to the spring chamber 164.

Next is a description of switching operation of the garage shift valve 160.

In this embodiment, the ON-OFF solenoid valve SL1 is provided as a control valve for performing switching of the garage shift valve 160. The ON-OFF solenoid valve SL1 is configured to switch between the ON state and the OFF state according to commands sent from the electronic control apparatus 80. It is possible to use a normally closed-type electromagnetic valve as described below as the ON-OFF solenoid valve SL1, and a configuration may also be adopted in which a normally open-type electromagnetic valve is used. Also note that instead of the ON-OFF solenoid valve SL1, it is possible to use a linear-type electromagnetic valve, a duty-type electromagnetic valve, a three-way valve-type electromagnetic valve, or the like as the control valve for performing switching of the garage shift valve 160.

Specifically, when the ON-OFF solenoid valve SL1 is in the ON state, in which electric power is turned on, a predetermined control oil pressure PSL1 is output from the output port SL1*b*, and that control oil pressure PSL1 is supplied to the garage shift valve 160. With that control oil pressure PSL1, the spool 161 moves downward against the biasing force of the spring 162. Thus, the garage shift valve 160 is held in the control position. On the other hand, when the ON-OFF solenoid valve SL1 is in the OFF state, in which electric power is not turned on, output of that control oil pressure PSL1 is stopped. With that biasing force of the spring 162, the spool 161 moves upward. Thus, the garage shift valve 160 is held in the normal position. Also, a first modulator oil pressure PM1 regulated by a first modulator valve using the line oil pressure PL as the source pressure is introduced to the ON-OFF solenoid valve SL1 via an input port SL1*a*. Here, the aforementioned second modulator valve is provided on the downstream side of the primary regulator valve 110, and the first modulator valve is provided on the downstream side of the second modulator valve. Thus, the first modulator oil pressure PM1 is set lower than the second modulator oil pressure PM2.

The ON-OFF solenoid valve SL1 is controlled to the ON state during a state of engagement transition of the forward movement clutch C1 of the forward/reverse switching apparatus 30, i.e., from when the engagement operation of the forward movement clutch C1 begins until the forward movement clutch C1 reaches the state of complete engagement. Along with this, the control oil pressure PSL1 of the ON-OFF solenoid valve SL1 is introduced to the control oil pressure chamber 163 via the control port 165, and thus the garage shift valve 160 is held in the control position. Thus, the input port 166*b* and the output port 167 are in communication.

In this case, the input port 176 and the output port 177 of the manual valve 170 are in communication, so due to the input port 166*b* and the output port 167 being in communication, the control oil pressure PSLT of the linear solenoid valve SLT is supplied to the oil pressure servo of the forward movement clutch C1. Accordingly, when the forward movement clutch C1 is in the state of engagement transition, the engagement transition oil pressure supplied to the oil pressure servo is the control oil pressure PSLT. Thus, engagement transition of the forward movement clutch C1 is controlled by the linear solenoid valve SLT. Here, because the control oil pressure PSLT of the linear solenoid valve SLT serving as the engagement transition oil pressure changes linearly according to the exciting current, during garage shifting, smooth engagement of the forward movement clutch C1 is possible, so it is possible to suppress a shock that accompanies engagement of the forward movement clutch C1.

On the other hand, the ON-OFF solenoid valve SL1 is controlled to the OFF state during a state of complete engagement in which the forward movement clutch C1 is completely engaged (for example, during regular travel or the like). In this case, supply of the control oil pressure PSL1 of the ON-OFF solenoid valve SL1 to the control oil pressure chamber 163 is stopped, so the garage shift valve 160 is held in the normal position. Thus, the input port 166*a* and the output port 167 are in communication. In this case, the input port 176 and the output port 177 of the manual valve 170 are in communication, so due to the input port 166*a* and the output port 167 being in communication, the second modulator oil pressure PM2 is supplied to the oil pressure servo of the forward movement clutch C1. Accordingly, when the forward movement clutch C1 is in the state of complete engagement, the engagement holding oil pressure supplied to the oil pressure servo is the second modulator oil pressure PM2. Here, the second modulator oil pressure PM2 is set to a fixed pressure (clutch pressure) that is no less than the control oil pressure PSLT, so it is possible to reliably hold the forward movement clutch C1 in the state of complete engagement.

Note that in a case other than that described above (a case other than when in the state of engagement transition or the state of complete engagement), the ON-OFF solenoid valve SL1 is controlled to the OFF state, and the garage shift valve 160 is held in the normal position. However, if the manual valve 170 is being switched corresponding to a position of the shift lever 87 other than a travel position such as the drive position "D", the input port 176 and the output port 177 of the manual valve 170 are blocked from each other, so the second modulator oil pressure PM2 is not supplied to the oil pressure servo of the forward movement clutch C1.

The lockup control valve 140 controls engagement/release of the lockup clutch 26. Specifically, lockup control valve 140 is configured to control engagement/release of the lockup clutch 26 by controlling the lockup differential pressure ΔP (ΔP=lockup engaging oil pressure PON−lockup releasing oil pressure POFF). Control of the lockup differential pressure ΔP by the lockup control valve 140 is performed by controlling the control oil pressure PSLT of the linear solenoid valve SLT.

The lockup control valve 140 is provided with a spool 141 that is movable in the axial direction and a spring 142 that serves as a biasing means that biases the spool 141 in one direction. In FIG. 3, the spool 141 is slidable in the vertical direction. The spring 142 is disposed in a compressed state in a spring chamber 144 provided on one end side of the spool 141 (the lower end side in FIG. 3). With biasing force of the spring 142, the spool 141 is pressed against in the direction (the upper direction in FIG. 3) that the lockup control valve 140 is held in the OFF position shown in the left half in FIG. 3. The lockup control valve 140 is provided with a control port 145a, a backup port 145b, input ports 146a and 146b, a releasing-side port 147a, an engaging-side port 147b, a feedback port 148, and drain ports 149a and 149b.

The control port 145a is connected to the control oil pressure chamber 143 provided on the other end side (the upper end side in FIG. 3) of the spool 141. Also, the control port 145a is connected to the output port 157 of the switching valve 150 via the oil path 104. When the switching valve 150 is being held in the OFF position, the control oil pressure PSLT of the linear solenoid valve SLT is supplied to the control oil pressure chamber 143, and when the switching valve 150 is being held in the ON position, the control oil pressure PSL2 of the ON-OFF solenoid valve SL2 is supplied to the control oil pressure chamber 143.

The backup port 145b is connected to the spring chamber 144. Also, the backup port 145b is connected to the output port SL1b of the ON-OFF solenoid valve SL1 via an oil path 108. The control oil pressure PSL1 of the ON-OFF solenoid valve SL1 is supplied to the spring chamber 144 via the backup port 145b.

The input ports 146a and 146b are each connected to an unshown secondary regulator valve, which is connected to the output port 117 of the primary regulator valve 110. A secondary oil pressure PSEC that has been regulated by the secondary regulator valve is input via the input ports 146a and 146b.

The release-side port 147a is connected to the releasing-side oil pressure chamber 262 of the lockup clutch 26 via an oil path 106a. The engaging-side port 147b is connected to an engaging-side oil pressure chamber 261 of the lockup clutch 26 via an oil path 106b.

The feedback port 148 is connected to the spring chamber 144. Also, the feedback port 148 is connected to the oil path 106b. The same oil pressure as the lockup engaging oil pressure PON is supplied to the spring chamber 144 via the feedback port 148.

Next is a description of operation of the lockup clutch 26 by the lockup control valve 140.

First, when the ON-OFF solenoid valve SL2 is in the OFF state, and the switching valve 150 is being held in the OFF position, the control oil pressure PSLT of the linear solenoid valve SLT is introduced to the control oil pressure chamber 143. At this time, the lockup control valve 140 enters a state (the ON state) in which according to that control oil pressure PSLT, the spool 141 has moved downward against the biasing force of the spring 142. In this case, the spool 141 moves further downward as the control oil pressure PSLT increases. In the right half in FIG. 3, a state is shown in which the spool 141 has moved downward as far as possible. In this state shown in the right half in FIG. 3, the input port 146b and the engaging-side port 147b are in communication, and the releasing-side port 147a and the drain port 149a are in communication. At this time, the lockup clutch 26 is in a completely engaged state.

When the lockup control valve 140 is in the ON state, the spool 141 slides vertically according to the balance of the combined force of the control oil pressure PSLT that is introduced to the control oil pressure chamber 143 and the lockup releasing oil pressure POFF that acts on the releasing-side port 147a, and the combined force of the lockup engaging oil pressure PON that is introduced to the spring chamber 144 and the biasing force of the spring 142. Here, the lockup clutch 26 is engaged according to the lockup differential pressure ΔP. Control of the lockup differential pressure ΔP is performed by controlling the control oil pressure PSLT of the linear solenoid valve SLT. Because the above control oil pressure PSLT changes linearly according to the exciting current, it is possible to continuously adjust the lockup differential pressure ΔP. Along with this, it is possible to continuously change the degree of engagement (clutch capacity) of the lockup clutch 26 according to the lockup differential pressure ΔP.

More specifically, as the control oil pressure PSLT increases, the lockup differential pressure ΔP increases, and thus the degree of engagement of the lockup clutch 26 increases. In this case, the working oil from the aforementioned secondary regulator valve is supplied to the engaging-side oil pressure chamber 261 of the lockup clutch 26 via the input port 146b, the engaging-side port 147b, and the oil path 106b. On the other hand, the working oil of the releasing-side oil pressure chamber 262 is discharged via the oil path 106a, the releasing-side port 147a, and the drain port 149a. When the lockup differential pressure ΔP becomes at least a predetermined value, the lockup clutch 26 reaches complete engagement.

Conversely, as the control oil pressure PSLT decreases, the lockup differential pressure ΔP decreases, and thus the degree of engagement of the lockup clutch 26 decreases. In this case, the working oil from the aforementioned secondary regulator valve is supplied to the releasing-side oil pressure chamber 262 via the input port 146a, the releasing-side port 147a, and the oil path 106a. On the other hand, the working oil of the engaging-side oil pressure chamber 261 is discharged via the oil path 106b, the engaging-side port 147b, and the drain port 149b. When the lockup differential pressure ΔP becomes a negative value, the lockup clutch 26 is in a released state.

On the other hand, when supply of the control oil pressure PSLT of the linear solenoid valve SLT to the control oil pressure chamber 143 is stopped, the lockup control valve 140 enters a state (OFF state) in which, as shown in the left half in FIG. 3, the spool 141 moves upward due to the biasing force of the spring 142, and is held at its original position. In this OFF state, the input port 146a and the releasing-side port 147a are in communication, and the engaging-side port 147b and the drain port 149b are in communication. At this time, the lockup clutch 26 is in a released state.

Next, when the ON-OFF solenoid valve SL2 is in the ON state, and the switching valve 150 is being held in the ON position, the control oil pressure PSL2 of the ON-OFF solenoid valve SL2 is introduced to the control oil pressure chamber 143. Because the control oil pressure PSL2 of the ON-OFF solenoid valve SL2 is set to a fixed pressure that is no less than the above control oil pressure PSLT, in the ON state of the ON-OFF solenoid valve SL2, the lockup control valve 140 is held in a state in which the spool 141 shown in the right half in FIG. 3 has moved downward as much as possible. Accordingly, the lockup clutch 26 is held in a completely engaged state.

When the ON-OFF solenoid valve SL1 is in the ON state, a control is performed to forcibly release the lockup clutch 26, without controlling engagement/release of the lockup clutch 26 as described above. In other words, when the garage shift valve 160 is held at the control position, and control of engagement transition of the forward movement clutch C1 is performed, the lockup clutch 26 is forcibly released.

As described above, when the ON-OFF solenoid valve SL1 is in the ON state, the control oil pressure PSL1 of the ON-OFF solenoid valve SL1 is introduced to the spring chamber 144. Due to the control oil pressure PSL1 of the ON-OFF solenoid valve SL1, force in the same direction as the biasing force of the spring 142 is applied to the spool 141, so regardless of whether or not the control oil pressure PSLT of the linear solenoid valve SLT or the control oil pressure PSL2 of the ON-OFF solenoid valve SL2 is supplied to the control oil pressure chamber 143, the lockup control valve 140 is held in the OFF state shown in the left half in FIG. 3. This is accompanied by the lockup clutch 26 being forcible released.

By forcing the lockup clutch 26 OFF in this manner, for example, when performing garage shifting when beginning vehicle movement or the like, even if a failure of the linear solenoid valve SLT to turn ON or the like occurs, it is possible to reliably return the lockup clutch 26 to the released state, and so it is possible to prevent the occurrence of an engine stall. In order to reliably return the lockup clutch 26 to the released state, a configuration may be adopted in which the combined force of the force due to the control oil pressure PSL1 of the ON-OFF solenoid valve SL1 and the biasing force of the spring 142 is larger than the force due to the control oil pressure PSL2 of the ON-OFF solenoid valve SL2. In this case, if the control oil pressure PSL1 of the ON-OFF solenoid valve SL1 is smaller than the control oil pressure PSL2 of the ON-OFF solenoid valve SL2, for example, by setting the acting area (pressure receiving area) of the control oil pressure PSL1 of the ON-OFF solenoid valve SL1 on the spool 141 to be larger than the acting area (pressure receiving area) of the control oil pressure PSL2 of the ON-OFF solenoid valve SL2 on the spool 141, it is possible to reliably return the lockup clutch 26 to the released state.

The failsafe valve 190 is a switching valve that switches oil paths in order to supply the line oil pressure PL to the oil pressure actuator 413 of the driving-side pulley 41 when, for example, the gear oil pressure control valve 120 or the linear solenoid valve SLP that controls the gear oil pressure control valve 120 fails. Specifically, when there is a possibility that sudden deceleration will occur in the belt-driven continuously variable transmission 40, such as when, for example, the gear oil pressure control valve 120 or the linear solenoid valve SLP that controls the gear oil pressure control valve 120 fails, the failsafe valve 190 is switched to the fail position shown in the right half in FIG. 3, and otherwise, i.e. during normal operation, the failsafe valve 190 is switched to the normal position shown in the left half in FIG. 3. The details of this failsafe valve 190 will be described below.

The linear solenoid valves SLT, SLP, and SLS, are, for example, normally open-type electromagnetic valves. That is, when electrical power is not turned on, the input port and the output port are in communication, and oil pressure that has been input is output from the output port as a control oil pressure. On the other hand, when electrical power is turned on, regulation of oil pressure that has been input from the input port is controlled according to the exciting current determined by a duty signal sent from the electronic control apparatus 80, and this oil pressure is output from the output port as a control oil pressure. In this case, regulation is controlled such that the control oil pressure decreases as the exciting current increases. When the exciting current is at least a predetermined value, the control oil pressure is "0", and output of the control oil pressure is stopped. For example, the control oil pressure PSLT of the linear solenoid valve SLT changes linearly according to the exciting current. Likewise, the control oil pressures PSLP and PSLS of the linear solenoid valves SLP and SLS also change linearly according to the exciting current. Note that a configuration may be adopted in which a normally closed-type electromagnetic valve is used as the linear solenoid valves SLT, SLP, and SLS.

The linear solenoid valve SLT is provided in order to perform control of regulation of the line oil pressure PL, control of engagement/release of the lockup clutch 26, and control of engagement transition of the forward movement clutch C1 (control of engagement transition oil pressure). A configuration may also be adopted in which instead of the linear solenoid valve SLT, a duty-type electromagnetic valve is used as an electromagnetic valve for performing these controls.

In more detail, the second modulator oil pressure PM2 that has been regulated by the second modulator valve is introduced to the linear solenoid valve SLT via an input port SLTa. Thus, when electrical power is not turned on, the second modulator oil pressure PM2 is output as the control oil pressure PSLT, and when electrical power is turned on, oil pressure obtained by linearly controlling regulation of the second modulator oil pressure PM2 according to the exciting current is output as the control oil pressure PSLT.

The control oil pressure PSLT to be output from the output port SLTb is first supplied to the switching valve 150. The switching valve 150 switches between supplying the control oil pressure PSLT to the primary regulator valve 110 via the oil path 103, and supplying the control oil pressure PSLT to the lockup control valve 140 via the oil path 104. That is, the switching valve 150 switches between control of regulation of the line oil pressure PL, and control of engagement/release of the lockup clutch 26. Control of regulation of the line oil pressure PL, and control of engagement/release of the lockup clutch 26 are performed based on the control oil pressure PSLT. Also, the control oil pressure PSLT to be output from the output port SLTb is supplied to the garage shift valve 160 via the oil path 105. Control of engagement transition of the forward movement clutch C1 is performed based on that control oil pressure PSLT.

The linear solenoid valve SLP is provided in order to control regulation of the gear oil pressure PIN of the belt-driven continuously variable transmission 40. A configuration may also be adopted in which instead of the linear solenoid valve SLP, a duty-type electromagnetic valve is used as a control valve for controlling regulation of the gear oil pressure PIN.

In more detail, the second modulator oil pressure PM2 that has been regulated by the second modulator valve is introduced to the linear solenoid valve SLP via an input port SLPa. Thus, when electrical power is not turned on, the second modulator oil pressure PM2 is output as the control oil pressure PSLP, and when electrical power is turned on, oil pressure obtained by linearly controlling regulation of the second modulator oil pressure PM2 according to the exciting current is output as the control oil pressure PSLP. The control oil pressure PSLP to be output from an output port SLPb is supplied to the gear oil pressure control valve 120. Control of regulation of the gear oil pressure PIN of the belt-driven continuously variable transmission 40 is performed based on this control oil pressure PSLP.

The linear solenoid valve SLS is provided in order to control regulation of the line oil pressure PL, and to control regulation of the clamping oil pressure POUT of the belt-driven continuously variable transmission 40. A configuration may also be adopted in which instead of the linear solenoid valve SLS, a duty-type electromagnetic valve is used as an electromagnetic valve for performing these controls.

In more detail, the second modulator oil pressure PM2 that has been regulated by the second modulator valve is introduced to the linear solenoid valve SLS via an input port SLSa. Thus, when electrical power is not turned on, the second modulator oil pressure PM2 is output as the control oil pressure PSLS, and when electrical power is turned on, oil pressure obtained by linearly controlling regulation of the second modulator oil pressure PM2 according to the exciting current is output as the control oil pressure PSLS. The control oil pressure PSLS to be output from the output port SLSb is supplied to the primary regulator valve 110 and the clamping oil pressure control valve 130 via the oil path 102. Control of regulation of the line oil pressure PL and control of regulation of the clamping oil pressure POUT of the belt-driven continuously variable transmission 40 are performed based on this control oil pressure PSLS.

Here, as described above, when the gear ratio γ is higher than γ1 (see FIG. 4), it is preferable to set the line oil pressure PL to be the same as or slightly higher than the target clamping oil pressure, and in this case, by controlling regulation of the line oil pressure PL based on the control oil pressure PSLS of the linear solenoid valve SLS, it is possible to suppress driving failure of the oil pump 27. On the other hand when the gear ratio γ is lower than γ1, it is preferable to set the line oil pressure PL to be the same as or slightly higher than the target gear oil pressure, and in this case, by controlling regulation of the line oil pressure PL based on the control oil pressure PSLT of the linear solenoid valve SLT, it is possible to suppress driving failure of the oil pump 27.

In this embodiment, the failsafe valve 190 is provided between the gear oil pressure control valve 120 and the oil pressure actuator 413 of the driving-side pulley 41.

This failsafe valve 190 is provided with a spool 191 that is movable in the axial direction and a spring 192 that serves as a biasing means that biases the spool 191 in one direction. The spool 191 is provided so as to be slidable vertically in FIG. 3. The spring 192 is disposed in a compressed state in a spring chamber 194 provided on one end side (the lower end side in FIG. 3) of the spool 191. With biasing force of the spring 192, the spool 191 is pressed against in the direction (the upper direction in FIG. 3) that the failsafe valve 190 is held in the normal position. The failsafe valve 190 is provided with control ports 195a and 195b, input ports 196a and 196b, and an output port 197.

The control port 195a is connected to a control oil pressure chamber 193a that is provided on the other end side (the upper end side in FIG. 3) of the spool 191. Also, the control port 195a is connected to the output port SL1b of the ON-OFF solenoid valve SL1 via the oil path 108. The control oil pressure PSL1 of the ON-OFF solenoid valve SL1 is supplied to a control oil pressure chamber 193 via the control port 195a.

The control port 195b is connected to a control oil pressure chamber 193b that is provided on the other end side of the same spool 191. Also, the control port 195b is connected to an output port SL2b of the ON-OFF solenoid valve SL2 via the oil path 109c. The control oil pressure PSL2 of the ON-OFF solenoid valve SL2 is supplied to the control oil pressure chamber 193b via the control port 195b.

The input port 196a is connected to the output port 127 of the gear oil pressure control valve 120 via the oil path 109a. The gear oil pressure PIN that has been regulated by the gear oil pressure control valve 120 is input via the input port 196a. The input port 196b is connected to the oil path 101, and the line oil pressure PL that has been regulated by the primary regulator valve 110 is input via this input port 196a. The output port 197 is connected to the oil pressure actuator 413 of the driving-side pulley 41 via the oil path 109d.

Next is a description of switching operation of the failsafe valve 190.

In this embodiment, a configuration is adopted in which the existing ON-OFF solenoid valves SL1 and SL2 are used as control valves for performing switching of the failsafe valve 190.

Specifically, when the ON-OFF solenoid valves SL1 and SL2 are both in the ON state, the failsafe valve 190 is switched to the fail position shown in the right half in FIG. 3, and when at least one of the ON-OFF solenoid valves SL1 and SL2 is in the OFF state, the failsafe valve 190 is switched to the normal position shown in the left half in FIG. 3.

Here, where the biasing force (load) of the spring 192 on the failsafe valve 190 is W1, the acting area (pressure receiving area) of the control oil pressure PSL1 supplied via the control port 195a on the spool 191 is S1, and the acting area (pressure receiving area) of the control oil pressure PSL2 supplied via the control port 195b on the spool 191 is S2, the following expressions (1), (2), and (3) are true. In other words, the load W1 of the spring 192, and the control oil pressures PSL1 and PSL2 of the ON-OFF solenoid valves SL1 and SL2, are set such that the following expressions (1), (2), and (3) are satisfied.

$$W1 > PSL1 * S1 \quad (1)$$

$$W1 > PSL2 * S2 \quad (2)$$

$$W1 < PSL1 * S1 + PSL2 * S2 \quad (3)$$

The ON-OFF solenoid valves SL1 and SL2 are both controlled to the ON state when it is determined that there is a possibility that a state of sudden deceleration will occur in the belt-driven continuously variable transmission 40. Thus, the failsafe valve 190 is held in the fail position. In this state, the input port 196b and the output port 197 are in communication, so the line oil pressure PL is supplied to the oil pressure actuator 413 of the driving-side pulley 41.

Here, examples of a case where there is a possibility that a state of sudden deceleration will occur in the belt-driven continuously variable transmission 40 include a case where the oil pressure of the oil pressure actuator 413 of the driving-side pulley 41 has suddenly dropped for some reason. An example of a cause of that sudden drop in oil pressure is that the gear oil pressure control valve 120 or the linear solenoid valve SLP that controls the gear oil pressure control valve 120 has failed. Failure of the gear oil pressure control valve 120 or the linear solenoid valve SLP includes, for example, failures due to a mechanical cause such as a stuck valve or the like, and failures due to an electrical cause, such as a wire disconnection or a short circuit.

Thus, in the following manner it is possible to determine whether or not there is a possibility that a state of sudden deceleration will occur in the belt-driven continuously variable transmission 40. For example, a configuration may be adopted in which when the deviation between a target gear ratio and the actual gear ratio of the belt-driven continuously variable transmission 40 is at least a predetermined value, a determination is made that there is a possibility that a state of sudden deceleration will occur in the belt-driven continuously variable transmission 40. The actual gear ratio of the belt-driven continuously variable transmission 40 can be calculated based on the output signals of the output shaft revolution speed sensor 84 and the input shaft revolution speed sensor 85. Also, a configuration may be adopted in which when the oil pressure of the oil pressure actuator 413 of the driving-side pulley 41 decreases, if the amount of variation is at least a predetermined value, then a determination is made that there is a possibility that a state of sudden deceleration will occur. The oil pressure of the oil pressure actuator 413, for example, can be detected by providing an oil pressure sensor. Also, a configuration may be adopted in which when a wire disconnection or a short circuit or the like of the gear oil pressure control valve 120 or the linear solenoid valve SLP has been detected, a determination is made that there is a possibility that a state of sudden deceleration will occur. A failure due to an electrical cause, such as a wire disconnection or a short circuit, can be detected with the electronic control apparatus 80.

On the other hand, during normal operation in which there is not a possibility that a state of sudden deceleration will occur in the belt-driven continuously variable transmission 40, the ON-OFF solenoid valves SL1 and SL2 are not both controlled to the ON state. Therefore, control of engagement transition of the forward movement clutch C1 and control of engagement/release of the lockup clutch 26 are not performed at the same time. At this time, the failsafe valve 190 is held in the normal position. In this state, the input port 196*b* and the output port 197 are in communication, so the gear oil pressure PIN that has been regulated by the gear oil pressure control valve 120 is supplied to the oil pressure actuator 413 of the driving-side pulley 41.

As described above, when there is a possibility that a state of sudden deceleration will occur in the belt-driven continuously variable transmission 40, such as when the gear oil pressure control valve 120 fails, the line oil pressure PL is supplied to the oil pressure actuator 413 of the driving-side pulley 41, so it is possible to suppress a sudden drop in the oil pressure of the oil pressure actuator 413, and thus it is possible to avoid the occurrence of a state of sudden deceleration. That is, due to introducing the line oil pressure PL, the gear ratio γ changes to the acceleration side, so it is possible to suppress a subsequent change of the gear ratio γ to the deceleration side. Thus, by using existing electromagnetic valves (the ON-OFF solenoid valves SL1 and SL2), it is possible to avoid the occurrence of a state of sudden deceleration without adding a new electromagnetic valve, and it is possible to prevent belt slippage or an excessive shock that occurs along with sudden deceleration. Also, it is possible to avoid increased cost and size of the apparatus. Moreover, in this case, a combination of the control states of the ON-OFF solenoid valves SL1 and SL2 not used during normal operation (a combination in which the ON-OFF solenoid valves SL1 and SL2 are both in the ON state) is used, so it is possible to avoid the occurrence of a state of sudden deceleration without inhibiting other controls that are performed during normal operation.

The control (switching control of the failsafe valve 190) that avoids occurrence of a state of sudden deceleration in the belt-driven continuously variable transmission 40 as described above may be continued until the vehicle stops, but it is preferable that when vehicle stoppage has been predicted, this control is ended. That is, it is preferable that when vehicle stoppage has been predicted, the failsafe valve 190 is switched from the fail position to the normal position. A configuration may be adopted in which at this time, at least one of the ON-OFF solenoid valves SL1 and SL2 is put in the OFF state. Examples of a case when vehicle stoppage has been predicted include, for example, a case when the vehicle speed has fallen to no more than a predetermined speed, and a case when depression of a brake pedal has been detected from a brake signal or the like.

Here, during vehicle stoppage, ordinarily, the gear ratio γ of the belt-driven continuously variable transmission 40 is returned to a most decelerated state, thus preparing for the next starting movement. However, when this control is continued, due to introducing the line oil pressure PL to the oil pressure actuator 413, the gear ratio γ changes to the acceleration side, so changing of the gear ratio γ to the deceleration side is inhibited. Accordingly, it is preferable that when vehicle stoppage has been predicted, by ending this control, changing of the gear ratio γ to the deceleration side is not inhibited. By adopting such a configuration, it is possible to return the gear ratio γ to the deceleration side by the time that the vehicle stops, so it is possible to prepare for the next vehicle starting movement.

Above, an embodiment of the invention was described, but the embodiment described here is an example, and various modifications are possible. Examples of such modifications are given below.

In the above embodiment, a case was described in which the line oil pressure PL is supplied to the oil pressure actuator 413 of the driving-side pulley 41 in order to avoid the occurrence of a state of sudden deceleration in the belt-driven continuously variable transmission 40, but a configuration may also be adopted in which, instead of the line oil pressure PL, clamping oil pressure POUT that has been regulated by the clamping oil pressure control valve 130 is supplied to the oil pressure actuator 413. A configuration may also be adopted in which other oil pressures, for example such as the first modulator oil pressure PM1, the second modulator oil pressure PM2, and the secondary oil pressure PSEC, are supplied to the oil pressure actuator 413. In other words, the oil pressure is suitable if, by supplying oil pressure to the oil pressure actuator 413, it is possible to change the gear ratio γ to the acceleration side.

In the above embodiment, a case was described in which switching of the failsafe valve 190 is performed with the existing ON-OFF solenoid valves SL1 and SL2, but a configuration may also be adopted in which switching of the failsafe valve 190 is performed with a combination of other existing electromagnetic valves. In this case, not only two existing electromagnetic valves, but three or more existing electromagnetic valves may also be used. In this way, by adopting a configuration in which the failsafe valve 190 is switched, by using an existing configuration as-is, it is possible to avoid increased cost and size of the apparatus.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An oil pressure control apparatus comprising:
   a belt-driven continuously variable transmission in which a belt is clamped with oil pressure to transmit motive power, and a gear ratio is changed by changing a belt hanging radius;
   a line oil pressure control valve that regulates a line oil pressure that becomes a source pressure of oil pressure of various parts;
   a gear oil pressure control valve that supplies a gear oil pressure that controls the gear ratio of the belt-driven continuously variable transmission to a driving-side pulley of the belt-driven continuously variable transmission; and
   a switching means that is connected between the gear oil pressure control valve and the driving-side pulley, and is capable of switching the oil pressure supplied to the driving-side pulley between the gear oil pressure and the line oil pressure;
   wherein when the gear oil pressure control valve or an electromagnetic valve that controls the gear oil pressure control valve fails, the switching means is switched so as to supply the line oil pressure to the driving-side pulley, and other than during such the gear oil pressure control valve's failure or the electromagnetic valve's failure, the switching means is switched so as to supply the gear oil pressure to the driving-side pulley.

2. The oil pressure control apparatus according to claim 1, wherein the switching means is a failsafe valve capable of switching between a normal position that supplies the gear oil pressure to the driving-side pulley, and a fail position that supplies the line oil pressure to the driving-side pulley.

3. The oil pressure control apparatus according to claim 2, wherein switching of the failsafe valve is controlled with a combination of control oil pressures of at least two existing electromagnetic valves.

4. The oil pressure control apparatus according to claim 2, comprising:
a hydraulic lockup clutch provided in a hydrodynamic power transmission apparatus provided between a motive power source and the belt-driven continuously variable transmission, the hydraulic lockup clutch directly coupling the motive power source side and the belt-driven continuously variable transmission side;
a hydraulic friction engaging element for travel that is engaged in order to establish a power transmission path when a vehicle travels;
a lockup control valve that is switched when controlling engagement/release of the lockup clutch; and
a garage control valve that is capable of switching an engaging oil pressure that is supplied when engaging the friction engaging element for travel between an engagement transition oil pressure and an engagement holding oil pressure;
wherein switching of the failsafe valve is performed with a combination of a control oil pressure of a first electromagnetic valve that controls the lockup control valve, and a control oil pressure of a second electromagnetic valve that controls the garage control valve.

5. The oil pressure control apparatus according to claim 4, wherein the failsafe valve is switched to the fail position when the first electromagnetic valve outputs a control oil pressure that switches the lockup control valve when the lockup clutch is engaged, and when the second electromagnetic valve outputs a control oil pressure that switches the garage control valve such that the engagement transition oil pressure is supplied to the friction engaging element for travel, and otherwise the failsafe valve is switched to the normal position.

6. The oil pressure control apparatus according to claim 5, wherein the first electromagnetic valve and the second electromagnetic valve are both ON-OFF electromagnetic valves; and
when the first electromagnetic valve and the second electromagnetic valve are both in an ON state in which a control oil pressure is output, the failsafe valve is switched to the fail position.

7. The oil pressure control apparatus according to claim 2, wherein while the failsafe valve is being held in the fail position, when vehicle stoppage has been predicted, the failsafe valve is switched from the fail position to the normal position.

8. The oil pressure control apparatus according to claim 1, wherein when the gear oil pressure control valve or an electromagnetic valve that controls the gear oil pressure control valve fails, instead of the line oil pressure, a clamping oil pressure that controls a belt clamping pressure of the belt-driven continuously variable transmission is supplied to the driving-side pulley.

9. The oil pressure control apparatus according to claim 1, wherein an input port of the switching means is connected to an output port of the gear oil pressure control valve and an output port of the switching means is connected to an oil pressure actuator of the driving side pulley.

* * * * *